3,562,357
METHOD FOR INCREASING YIELD OF CO-POLYMERS OF BUTENE-1 WITH LONG CHAIN OLEFINS
Raymond Eichenbaum, Providence, R.I., assignor to Mobil Oil Corporation, a corporation of New York
No Drawing. Filed Dec. 11, 1968, Ser. No. 783,125
Int. Cl. C08f 15/40
U.S. Cl. 260—878                                                    2 Claims

ABSTRACT OF THE DISCLOSURE

Copolymers of butene-1 and $C_{10}$–$C_{18}$ alpha olefins have low brittle temperatures. Yield of polymer is increased by first reacting Ziegler-Natta catalyst with the $C_{10}$–$C_{18}$ alpha olefin at 10–40° C. for 4–20 hours, and then introducing the catalyst and prepolymer, thus obtained, into the main butene-1 polymerization.

BACKGROUND OF THE INVENTION

Field of the invention

This invention is concerned with the improved production of copolymers of butene-1 with long chain alpha olefins in the presence of Ziegler-Natta catalysts.

Description of the prior art

In a copending application Ser. No. 554,507, filed June 1, 1966, now Patent No. 3,489,732 there is described a copolymer of butene-1 or butene - 1 - propylene with a $C_{10}$–$C_{18}$ olefin that has a low brittle temperature. That copolymer was produced by contacting a mixture of the olefin monomers with a specific Ziegler-Natta catalyst combination. No anticipatory prior art was found.

This invention is directed to an improved manipulation for increased yield, in which the $C_{10}$–$C_{18}$ olefin is "prepolymerized" with the catalyst prior to copolymerization with butene-1 or butene-1-propylene.

SUMMARY OF THE INVENTION

This invention provides in the process for preparing copolymers and terpolymers that comprises polymerizing a mixture selected from the group consisting of (1) butene-1 containing between about 0.1 mole percent and about 8 mole percent of a normal alpha olefin having between about 10 and about 18 carbon atoms and (2) butene-1 containing between about 5 mole percent and about 9 mole percent propylene and between about 0.1 mole percent and about 8 mole percent of a normal alpha olefin having between about 10 and about 18 carbon atoms; at a temperature between about 130° F. and about 150° F., and using a catalyst system consisting essentially of titanium trichloride, diethylaluminum chloride, and diethylaluminum iodide, wherein the mole percent ratio of diethylaluminum chloride to diethylaluminum iodide is between about 10:1 and about 0.5:1 and the molar ratio of aluminum to titanium is between about 2:1 and about 6:1, the improvement for increasing polymer yield that comprises prepolymerizing said $C_{10}$–$C_{18}$ mono alpha olefin with said catalyst system, in the absence of other monomer, at between about 10° C. and about 40° C. for between about 4 hours and about 20 hours, and then mixing the catalyst system and the prepolymer with said butene-1 or with said butene-1 and propylene and carrying out the copolymerization.

DESCRIPTION OF SPECIFIC EMBODIMENTS

The comonomer used to modify polybutene-1 and butene-1 propylene copolymer is a long chain normal alpha monoolefin containing between about 10 and about 18 carbon atoms, i.e., decene-1, undecene-1, dodecene-1, tridecene - 1, tetra - decene - 1, pentadecene-1, hexadecene-1, heptadecene-1, and octadecene-1. In general, the amount of long chain monoolefin used in producing the copolymers and terpolymers will be between about 0.1 mole percent and about 8 mole percent of the comonomer feed and preferably between about 0.1 and about 5 mole percent. Within the range, however, the amount used will depend upon whether a copolymer or a terpolymer is under consideration and also upon the chain length of the long chain monoolefin. In the case of the copolymer, the amount used will be between about 0.1 mole percent and about 8 mole percent, preferably between about 0.1 and about 5 mole percent. In the case of the terpolymer, the amount used will be between about 0.1 mole percent and about 6 mole percent, preferably between about 0.1 and about 4 mole percent. Within the aforedescribed ranges, the greater the chain length of the long chain normal alpha monoolefin, the amount of long chain monoolefin required to lower brittle temperatures will be smaller. Thus, for the shorter long chain monoolefin, such as dodecene-1, between about 1 and about 8 mole percent, preferably between about 1 and about 5 mole percent, will be used in the copolymer feed; and between about 0.5 and about 6 mole percent, preferably between about 0.5 and about 4 mole percent, will be used in the terpolymer feed. On the other hand, with a longer chain monoolefin, such as octadecene-1, between about 0.1 and about 2 mole percent, preferably between about 0.1 and 1 mole percent, will be used both in the copolymer and in the terpolymer feed. With intermediate chain length monoolefins intermediate portions of the ranges will be used.

When producing the copolymers, the other olefin monomer will be butene-1. In the case of the terpolymers, however, the other two monomers will be butene-1 and propylene. The relative amounts of propylene and butene-1 in comonomer feed will be between about 5 mole percent and about 9 mole percent, preferably between about 6 mole percent and about 8 mole percent, in order to obtain a product having good mechanical properties and dimensional stability. Other than the long chain monoolefin, the balance of the feed is butene-1. It will be noted that the butene - 1 - propylene copolymer that is the basis of the terpolymer is that described in copending application Ser. No. 508,419, filed on Nov. 18, 1965 now Pat. No. 3,464,962.

The catalyst system used in the process of producing the copolymers and terpolymers in accordance with this invention consists essentially of titanium trichloride, diethylaluminum iodide, and diethylaluminum chloride. The molar ratio of diethylaluminum chloride to diethylaluminum iodide will be between about 10 and about 0.5, preferably between about 4 and about 0.5. The molar ratio of aluminum to titanium in the catalyst system will be between 3:1 and 6:1.

It is essential that the cocatalyst used herein is a mixture of diethylaluminum chloride and diethylaluminum iodide. The use of diethylaluminum iodide alone with $TiCl_3$ results in a catalyst system of low activity. When only diethylaluminum chloride is used in the catalyst system, the polymers produced have a low tensile modulus. Reference should be made to Ser. No. 508,419, now Patent No. 3,464,962 for specific details and examples of the use of the catalyst system in various types of polymerization operations.

The improvement provided by this invention produces an increased yield of copolymer, as measured by the weight of polymer produced per weight of $TiCl_3$ per hour. In accordance with this invention, this is accomplished by carrying out the polymerization in two steps.

In the first step, the alpha olefin having 10–18 carbon atoms is subjected to a mild polymerization in the presence of the catalyst system, but in the absence of any other monomer. This step is carried out at between about 10° C. and about 40° C. for a period of time between about 4 hours and about 20 hours. By such treatment, there is obtained a mixture of the catalyst system, polyolefin, and possibly some unreacted olefin monomer.

In the second step (the main copolymerization), this mixture is mixed with a butene-1 or the butene-1 and propylene and the mixture is copolymerized as aforedescribed.

As in any stereospecific polymerization process of this type, anhydrous conditions must be maintained and air and oxygen must both be excluded. This is accomplished conventionally by operating both steps of the process under an atmosphere of inert gas, such as nitrogen. If it is desired to control the molecular weight of the copolymer, conventional materials for this purpose, such as hydrogen and carbon dioxide, can be added to the reaction system. Deactivation and removal of catalyst components from the reactor effluent and copolymer product recovery are effected by any of the various means well known to those skilled in the art.

Preferably, the polymerization operation is carried out using bulk polymerization techniques, i.e., without the use of solvents or slurring media other than the 1-olefins charged, both in batch and in continuous operations. As is well known in the art, however, olefin polymerizations are frequently carried out in the presence of a solvent medium. The polymers produced in accordance with this invention can be likewise prepared in the presence of a solvent or slurring agent. Typical solvents and slurring agents, as is well known in the art, include hexane, heptane, octane, benzene, toluene, various paraffinic and aromatic hydrocarbon fractions, and halogenated hydrocarbons.

EXAMPLES 1 THROUGH 5

A series of five runs was carried out in two steps using octadecene-1 and butene-1 under nitrogen atmosphere. In each run the components of the catalyst system were titanium trichloride ($3TiCl_3 \cdot AlCl_3$) and a mixture of 80 mole percent diethylaluminum chloride and 20 mole percent diethylaluminum iodide (4:1 ratio). The molar ratio of aluminum to titanium was 3:1. In the first step of each run, the octadecene-1 and catalyst system were contacted by stirring at ambient temperature (about 20° C.) for times varying (as shown in the table) between about 10 minutes and 19 hours. Based upon the final copolymerization mixture, the amount of octadecene-1 was 0.4 mole percent. In each run, after the indicated stirring time, the resulting mixture of catalyst, polyoctadecene-1, and octadecene-1 was transferred to an autoclave containing butene-1 (99.6 mole percent) and the second step (copolymerization) was carried out at 150° F. (66° C.) for 1 hour, using a hydrogen partial pressure of 20 p.s.i.g. for molecular weight control. For each two-step run, the catalyst activity (grams polymer per gram $TiCl_3$ per hour) was determined and analysis was made for Flow Rate (FR) by ASTM Designation D1238–65T using condition (E). Pertinent data and results are set forth in the table.

| | First step, time, hours | Catalyst activity | Flow rate |
|---|---|---|---|
| Examples: | | | |
| 1 | 0.166 | 298 | 1.13 |
| 2 | 4.0 | 352 | 1.30 |
| 3 | 7.0 | 389 | 1.20 |
| 4 | 8.0 | 400 | 3.50 |
| 5 | 19.0 | 388 | 3.70 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. In the process for preparing copolymers and terpolymers that comprises polymerizing a mixture selected from the group consisting of (1) butene-1 containing between about 0.1 mole percent and about 8 mole percent of a normal alpha olefin having between about 10 and about 18 carbon atoms and (2) butene-1 containing between about 5 mole percent and about 9 mole percent propylene and between about 0.1 mole percent and about 8 mole percent of a normal alpha olefin having between about 10 and about 18 carbon atoms; at a temperature between about 130° F. and about 150° F., and using a catalyst system consisting essentially of titanium trichloride, diethylaluminum chloride, and diethylaluminum iodide, wherein the mole percent ratio of diethylaluminum chloride to diethylaluminum iodide is between about 10.1 and about 0.5:1 and the molar ratio of aluminum to titanium is between about 2:1 and about 6:1, the improvement for increasing polymer yield that comprises prepolymerizing said $C_{10}$–$C_{18}$ mono alpha olefin with said catalyst system, in the absence of the other monomer, at between about 10° C. and about 40° C. for between about 4 hours and about 20 hours, and then mixing the catalyst system and the prepolymer with said butene-1 or with said butene-1 and propylene and carrying out the copolymerization.

2. The improved process of claim 1, wherein said copolymer is a copolymer of butene-1 and octadecene-1.

References Cited

UNITED STATES PATENTS 3,480,696    11/1960    Hassell _____ 260—878

JOSEPH L. SCHOFER, Primary Examiner

R. S. BENJAMIN, Assistant Examiner

U.S. Cl. X.R.

260—88.2, 80.78